United States Patent
Apfel (10) Patent No.: US 7,791,221 B2
(45) Date of Patent: Sep. 7, 2010

(54) POWER SOURCING EQUIPMENT DEVICE INCLUDING A SERIAL INTERFACE

(75) Inventor: Russell Apfel, Austin, TX (US)

(73) Assignee: Silicon Laboratories, Inc., Austin, TX (US)

( * ) Notice: Subject to any disclaimer, the term of this patent is extended or adjusted under 35 U.S.C. 154(b) by 304 days.

(21) Appl. No.: 12/115,086

(22) Filed: May 5, 2008

(65) Prior Publication Data
US 2009/0273238 A1    Nov. 5, 2009

(51) Int. Cl.
    H02J 1/00 (2006.01)
(52) U.S. Cl. ........................................ 307/31
(58) Field of Classification Search ............ 307/31
    See application file for complete search history.

(56) References Cited

U.S. PATENT DOCUMENTS 6,996,458 B2    2/2006    Pincu et al. ............ 700/297
2004/0164619 A1  8/2004  Parker et al. ............ 307/80
2006/0178783 A1  8/2006  Herbold et al. .......... 700/286
2007/0021094 A1  1/2007  Elkayam et al. .......... 455/402
2007/0237322 A1 10/2007  Hussain et al. .......... 379/413
2008/0052546 A1  2/2008  Schindler et al. ........ 713/300
2008/0175260 A1* 7/2008  Hussain et al. .......... 370/419
2009/0172656 A1* 7/2009  Landry et al. ........... 717/173

* cited by examiner

Primary Examiner—Albert W Paladini
Assistant Examiner—Hal I Kaplan
(74) Attorney, Agent, or Firm—Polansky & Associates, PLLC; R. Michael Reed (57) ABSTRACT

In a particular embodiment, a circuit device is disclosed that includes a power sourcing equipment (PSE) circuit having a plurality of high-voltage line circuits adapted to communicate with a respective plurality of powered devices via network cables. The PSE circuit includes a serial interface circuit and includes a common controller coupled to the serial interface circuit and to the plurality of high-voltage line circuits. The circuit device also includes a low-voltage circuit having a programmable controller adapted to transmit control signals to the common controller via the serial interface circuit to control operation of the plurality of high-voltage line circuits.

20 Claims, 6 Drawing Sheets

POWER SOURCING EQUIPMENT DEVICE INCLUDING A SERIAL INTERFACE

FIELD OF THE DISCLOSURE

The present disclosure is generally related to a power sourcing equipment architecture including a serial interface.

BACKGROUND

Power over Ethernet (PoE), which is outlined in IEEE Standard 802.3™-2005 clause 33 (the PoE standard), refers to a technique for delivering power and data to an electronic device via Ethernet cabling. In a PoE system, a power-sourcing equipment (PSE) device provides a power supply and data to electronic devices, which may be referred to as powered devices, via twisted pair wires of an Ethernet cable. A powered device is an electronic device that derives its operating power supply and receives data from the same cable. In a particular embodiment, a powered device is a PoE-enabled device. Such powered devices may include voice over Internet protocol (VoIP) telephones, wireless routers, security devices, field devices to monitor process control parameters, data processors, and the like. PoE, broadband over power lines (BPL), and other power/data delivery systems eliminate the need for a separate power source to deliver power to attached powered devices.

Generally, a PSE device includes multiple high-voltage line interfaces to connect to the Ethernet cabling and provides a number of high-voltage functions that include specific protocols and control for safe operations of the high-voltage line interfaces. Often, PSE circuits are used in switches that include multiple line interfaces (typically from four to 192 line interfaces). Typically, each high-voltage line circuit includes control circuitry that performs digital control and timing operations. Such control circuitry is rated for high-voltages and is therefore expensive relative to other low power circuitry.

SUMMARY

In a particular embodiment, a circuit device is disclosed that includes a power sourcing equipment (PSE) circuit having a plurality of high-voltage line circuits adapted to communicate with a respective plurality of powered devices via network cables. The PSE circuit includes a serial interface circuit and includes a common controller coupled to the serial interface circuit and to the plurality of high-voltage line circuits. The circuit device also includes a low-voltage circuit having a programmable controller adapted to transmit control signals to the common controller via the serial interface circuit to control operation of the plurality of high-voltage line circuits.

In another particular embodiment, a power sourcing equipment (PSE) device includes a power sourcing equipment (PSE) circuit. The PSE circuit includes multiple high-voltage line interface circuits to provide power to one or more powered devices, a common controller adapted to control operation of the multiple high-voltage line interface circuits, and a serial interface. The PSE device further includes a low-voltage circuit coupled to the PSE circuit via the serial interface. The low-voltage circuit includes a programmable controller to send commands to the common controller to control respective power levels supplied to the multiple high-voltage line interface circuits.

In still another particular embodiment, a method of controlling a power supply to a powered device is disclosed that includes receiving an analog signal at a low-voltage circuit from a measurement circuit of a high-voltage power sourcing equipment (PSE) circuit. The analog signal is related to an electrical parameter associated with a high-voltage line interface circuit. The method further includes converting the analog signal to a digital signal using an analog-to-digital (A/D) circuit at the low-voltage circuit and processing the digital signal at a programmable controller of the low-voltage circuit. A control signal is sent by the programmable controller to the PSE circuit via a serial connection to control the high-voltage line interface circuit.

DETAILED DESCRIPTION OF ILLUSTRATIVE EMBODIMENTS

Figure 1:
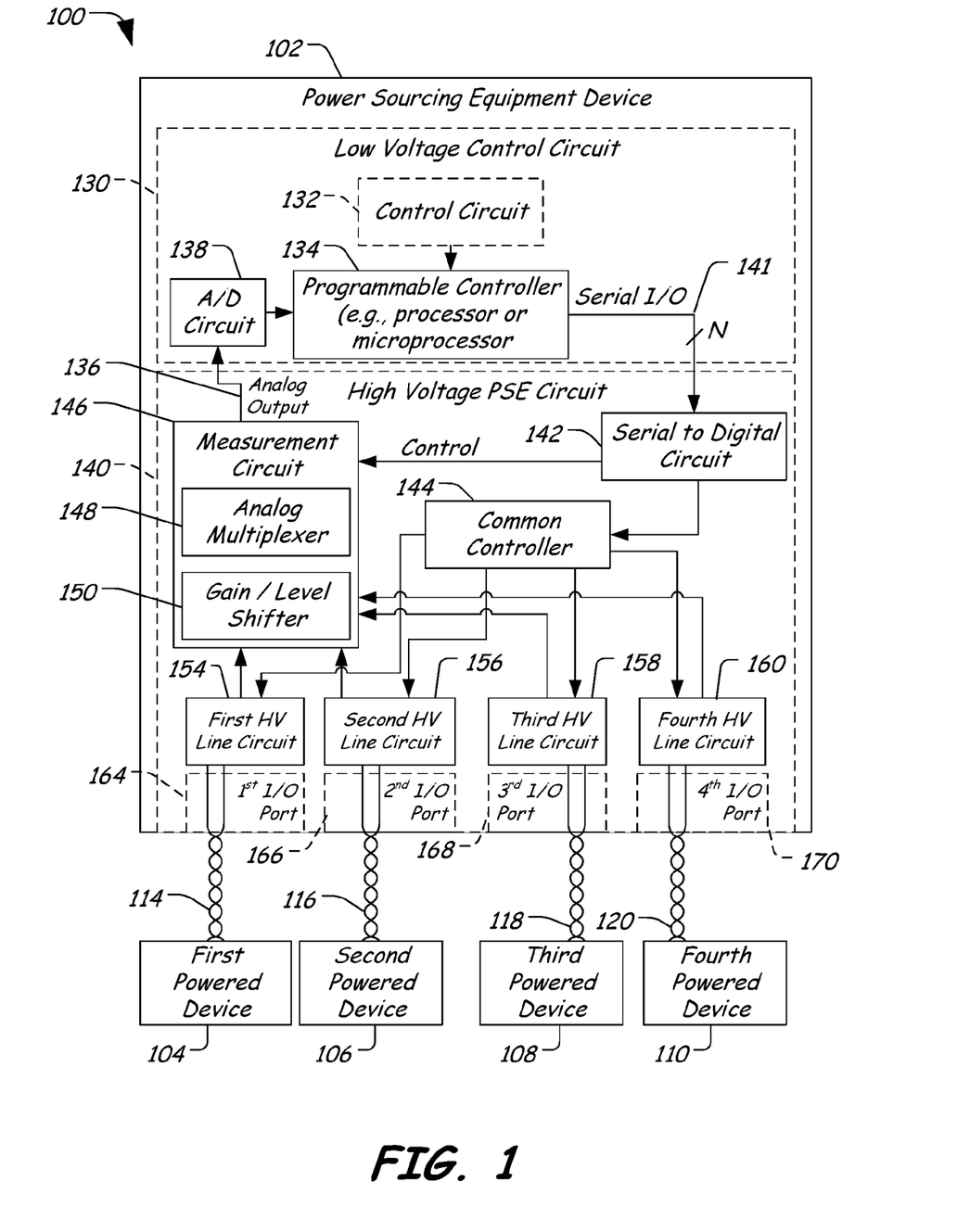
FIG. 1 is a block diagram of a particular illustrative embodiment of a power over Ethernet (PoE) system including a power sourcing equipment (PSE) device having a serial interface.

FIG. 1 is a block diagram of a particular illustrative embodiment of a power over Ethernet (PoE) system 100 including a power sourcing equipment (PSE) device 102 having a serial interface. The PSE device 102 is adapted to communicate with a first powered device 104 via a first network cable 114. The PSE device 102 is also adapted to communicate with second, third, and fourth powered devices 106, 108, and 110 via respective second, third, and fourth network cables 116, 118, and 120. In a particular embodiment, the first, second, third, and fourth network cables 114, 116, 118, and 120 are category-5 (CAT-5) twisted pair network cables that carry power and data. In another particular embodiment, the first, second, third, and fourth network cables 114, 116, 118, and 120 are power lines adapted to carry both power and data signals. The first, second, third, and fourth powered devices 104, 106, 108 and 110 are adapted to receive power and data via the network cables 114, 116, 118, and 120.

The PSE device 102 includes a low-voltage control circuit 130 and a high-voltage PSE circuit 140. In a particular embodiment, the low-voltage control circuit 130 may include a control circuit 132. In another particular embodiment, the control circuit 132 may be remote from the low-voltage control circuit 130 and may communicate with the low-voltage control circuit 130 via a system interface (such as the system interface 201 illustrated in FIG. 2). In a particular embodiment, the control circuit 132 is adapted to provide operating instructions to a programmable controller 134, which communicates with the high-voltage PSE circuit 140 via a serial line 141 coupled to a serial-to-digital circuit 142 of the high-voltage PSE circuit 140. In general, the serial line 141 may include two or more wires to facilitate serial communications.

The low-voltage control circuit 130 also includes an analog-to-digital (A/D) circuit 138 that receives an analog output 136 from the high-voltage PSE circuit 140. In a particular embodiment, the A/D circuit 138 is a low-cost A/D converter that has a low-resolution, such as a resolution of 10 bits or less. The A/D circuit 138 is adapted to convert a received analog output 136 into a digital signal for processing using the programmable controller 134.

The high-voltage PSE circuit 140 includes the serial-to-digital circuit 142 (such as a serial interface) that is coupled to the programmable controller 134 of the low-voltage control circuit 130. Further, the serial-to-digital circuit 142 is coupled to a common controller 144, which is coupled to multiple high-voltage line circuits. The serial-to-digital circuit 142 is also coupled to a measurement circuit 146, which is coupled to the multiple high-voltage line circuits to measure one or more electrical parameters. The multiple high-voltage line circuits include a first high-voltage line circuit 154, a second high-voltage line circuit 156, a third high-voltage line circuit 158, and a fourth high-voltage line circuit 160. The first high-voltage line circuit 154 is coupled to the first powered device 104 via a first input/output (I/O) port 164 that is coupled to the first network cable 114. The second high-voltage line circuit 156 is coupled to the second powered device 106 via a second I/O port 166 that is coupled to the second network cable 116. The third high-voltage line circuit 158 is coupled to the third powered device 108 via a third I/O port 168 that is coupled to the third network cable 118. The fourth high-voltage line circuit 160 is coupled to the fourth powered device 110 via a fourth I/O port 170 that is coupled to the fourth network cable 120. In a particular embodiment, each of the first, second, third, and fourth I/O ports 164, 166, 168, and 170 may be an Ethernet port sized to receive an Ethernet connector, such as an RJ-45 connector.

The measurement circuit 146 includes an analog multiplexer 148 that is adapted to selectively couple the measurement circuit 146 to a selected high-voltage line circuit, such as the first high-voltage line circuit 154. The measurement circuit 146 also includes a gain/level shifter 150 that is adapted to amplify a measurement signal, to level shift the measurement signal, or any combination thereof. The measurement circuit 146 is adapted to provide an analog output 136 related to the measurement signal to the low-voltage control circuit 130.

In a particular embodiment, the programmable controller 134 is adapted to send control signals to the common controller 144 and to the measurement circuit 146 via the serial line 141 and the serial-to-digital circuit 142. The common controller 144 controls one or more of the multiple high-voltage line circuits (such as the first high-voltage line circuit 154, the second high-voltage line circuit 156, the third high-voltage line circuit 158, the fourth high-voltage line circuit 160, or any combination thereof) based on the control signal. The common controller 144 also controls the measurement circuit 146 to measure an electrical parameter of a selected one of the multiple high-voltage line circuits based on the control signal. For example, the common controller 144 controls the measurement circuit 146 to select a particular high-voltage line circuit, such as the second high-voltage line circuit 156 using the analog multiplexer 148. In a particular embodiment, the common controller 144 may also adjust the gain/level shifter 150 based on the control signal from the programmable controller 134 to level shift, amplify, or otherwise adjust the measurement signal to produce the analog output 136, which is provided to the programmable controller 134 via the A/D circuit 138. In a particular embodiment, the programmable controller 134 is adapted to perform any number of low-voltage functions, including comparing a digitized version of the analog output to a threshold current or voltage level, grooming or conditioning the digitized version of the analog output prior to transmission or storage of data related to the digitized version, other functions, or any combination thereof. In a particular example, the programmable controller 134 is adapted to control the high-voltage PSE circuit 140 to perform powered device detection and classification operations, to provide power to powered devices based on their device classifications, and to monitor for power events, such as over-voltage, over-current, other power-related events, or any combination thereof.

In a particular embodiment, using the programmable controller 134 to implement as many low-voltage functions as possible, reduces the complexity and the costs associated with circuitry within the high-voltage PSE circuit 140. Further, by using the programmable controller 134 to control the operation of the high-voltage PSE circuit 140, the programmable controller 134 can be reprogrammed to implement new features, to measure additional electrical parameters, to implement new requirements of a power standard (such as the PoE Standard), or any combination thereof, without having to modify the high-voltage PSE circuit 140.

In a particular embodiment, the serial-to-digital circuit 142 allows the low-voltage circuit 130 to control the operation of the multiple high-voltage line circuits 154, 156, 158, and 160 via the common controller 144. A single analog signal (indicated by the analog output 136) from the high-voltage PSE circuit 140 to the low-voltage control circuit 130 can be used to measure and monitor the operation of the high-voltage PSE circuit 140, and of the first, second, third, and fourth high-voltage line circuits 154, 156, 158, and 160. The analog signal is multiplexed at the analog multiplexer 148 of the measurement circuit 146, allowing several different voltage and current measurements to be made with appropriate gain control and level shifting via the gain/level shifter 150. This arrangement allows a simple A/D circuit 138 to be used at the low-voltage circuit 130 to measure multiple lines of the first, second, third, and fourth high-voltage line circuits 154, 156, 158, and 160.

Figure 2:
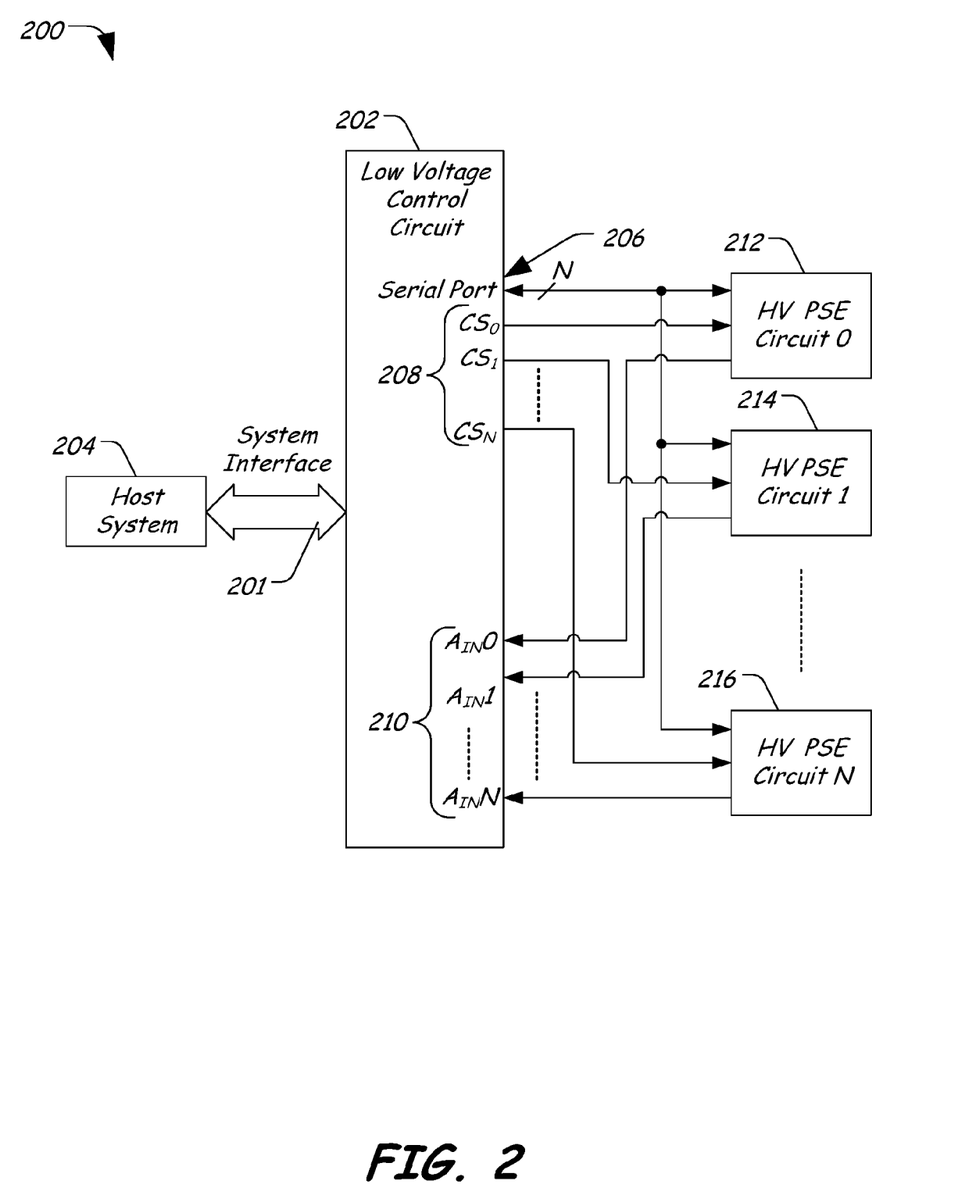
FIG. 2 is a block diagram of a particular illustrative embodiment of a PSE device including a serial interface.

FIG. 2 is a block diagram of a particular illustrative embodiment PSE device 200 including a serial interface. The PSE device 200 includes a low-voltage control circuit 202 having a system interface 201 adapted to communicate with a host system 204. In a particular example, the host system 204 can be a computer. In a particular embodiment, the system interface 201 is a standard computer system interface (SCSI), a universal serial bus (USB) interface, an Ethernet interface, a serial interface, or any combination thereof. The low-voltage control circuit 202 also communicates with multiple high-voltage PSE circuits, such as the high-voltage PSE circuit 140 illustrated in FIG. 1. As shown, the low-voltage control circuit 202 communicates with a first high-voltage PSE circuit 212, a second high voltage PSE circuit 214, and an n-th high-voltage PSE circuit 216 via a serial port 206 including any number of lines. The low-voltage control circuit 202 may also communicate with the first, second, and n-th high-voltage PSE circuits 212, 214, and 216 via control ports 208 and analog input ports 210. In a particular embodiment, the serial port 206 includes the control ports 208.

Each of the high-voltage PSE circuits 212, 214, and 216 is adapted to communicate with one or more powered devices, such as the first powered device 104 illustrated in FIG. 1. The low-voltage control circuit 202 is adapted to control operation of multiple high-voltage PSE circuits, concurrently.

In a particular embodiment, the low-voltage control circuit 202 receives instructions from the host system 204 via the host interface 201. The low-voltage control circuit 202 controls the first high-voltage PSE circuit 212 via the serial port 206 and/or the control ports 208 to provide power to one or more powered devices. Further, the low-voltage control circuit 202 receives analog information from the first, high-voltage line PSE circuits 212 via the analog inputs 210. In a particular embodiment, the low-voltage control circuit 202 includes an analog-to-digital converter, such as the A/D circuit 138 illustrated in FIG. 1, to convert the analog information into digital data. The low-voltage control circuit 202 also includes a processor or a microprocessor, such as the programmable controller 134 illustrated in FIG. 1, to process the digital data to make control decisions related to the first high-voltage PSE circuit 212. In a particular example, the low-voltage control circuit 202 is adapted to control the first, second, and n-th high-voltage PSE circuits 212, 214, and 216 to perform powered device detection, powered device classification, powered device monitoring, or any combination thereof, according to the PoE standard.

In a particular embodiment, the serial port 206 includes three pins allowing full bi-directional control. The low-voltage control circuit 202 is adapted to use multiple chip selects to address the first, second, and n-th high-voltage PSE circuits 212, 214, 216, or any combination thereof. Thus, the low-voltage control circuit 202 can interface to multiple high-voltage PSE circuits. Each of the PSE circuits 212, 214, and 216 may provide power and data to multiple powered devices, such as the first powered device 104 illustrated in FIG. 1.

Figure 3:
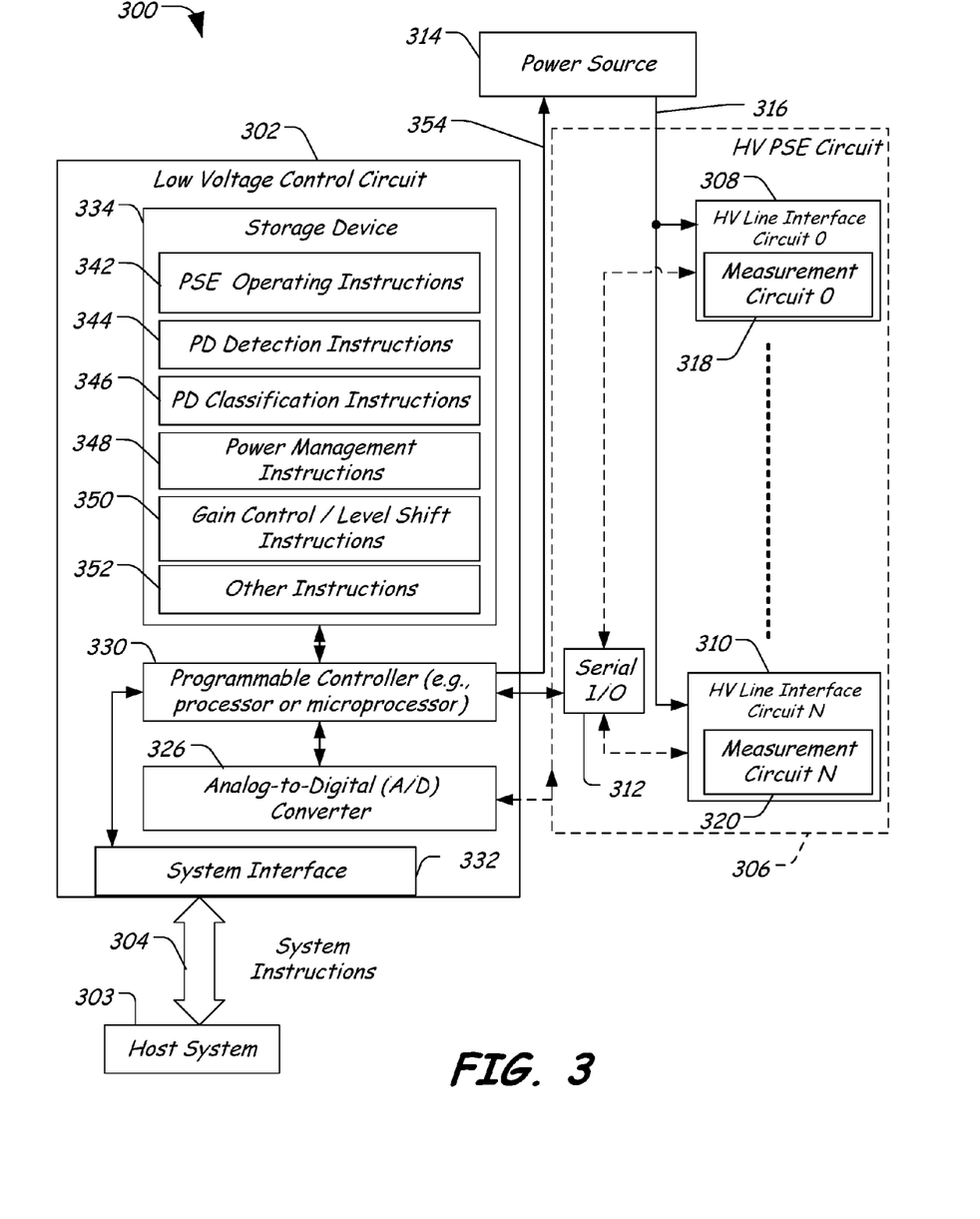
FIG. 3 is a block diagram of another particular illustrative embodiment of a PSE device including a serial interface.

FIG. 3 is a block diagram of another particular illustrative embodiment of a PSE device 300 including a serial interface. The PSE device 300 includes a low-voltage control circuit 302 that communicates with a high-voltage PSE circuit 306 via a serial connection. The low-voltage control circuit 302 is adapted to communicate with a host system 303 via a system interface 304. In a particular embodiment, the host system 303 can be a computer that is coupled to the low-voltage control circuit 302 via an interface, such a simple computer system interface (SCSI), a universal serial bus (USB) interface, another interface, or any combination thereof. In a particular example, the low-voltage control circuit 302 may receive system instructions or other commands from the host system 303 via the system interface 304. The low-voltage circuit 302 is also adapted to communicate with a power source 314 via line 354.

The high-voltage PSE circuit 306 includes a first high-voltage line interface circuit (0) 308 with an associated measurement circuit (0) 318. The high-voltage PSE circuit 306 also includes an n-th high-voltage line interface circuit (N) 310 with an associated measurement circuit (N) 320. The first and n-th high-voltage line interface circuits 308 and 310 are adapted to communicate with powered devices, such as the first powered device 104 illustrated in FIG. 1. The first and n-th high-voltage line interface circuits 308 and 310 are coupled to the power source 314 via line 316. The high-voltage PSE circuit 306 further includes a serial input/output (I/O) interface 312, which is coupled to the low-voltage control circuit 302 to receive serial control signals and which is coupled to the first and n-th high-voltage line interface circuits 308 and 310.

The low-voltage control circuit 302 includes a processor 330 that is coupled to an interface 332, to an analog-to-digital converter 326, and to a storage device 334. The interface 332 is coupled to the host system 303 via a system interface 304. The analog-to-digital (A/D) converter 326 may receive analog measurement information directly from the first and n-th measurement circuits 318 and 320, from the serial I/O circuit 310, from another circuit, or any combination thereof. The A/D converter 326 is adapted to convert the analog measurement information into digital data that can be processed via the processor 330 to determine, for example, a measurement value.

The memory device 334 is adapted to store processor executable instructions. For example, the memory device 334 stores PSE operating instructions 342, which are executable by the processor 330 to control operation of the High-voltage PSE circuit 306. The memory device 334 also includes powered device detection instructions 344 that are executable by the processor 330 to control the power source 314 and the high-voltage PSE circuit 306 to apply a powered device detection signal at a selected high-voltage line interface circuit, such as the n-th high-voltage line interface circuit (N) 310. For example, the powered device detection instructions 344 may be executed by the processor 330 to control the high voltage PSE circuit 306 to measure a powered device signature at the n-th high-voltage line interface circuit (N) 310 using the measurement circuit 320 and to provide the measurement information to the A/D converter 326.

The memory device 334 also includes powered device classification instructions 346 that are executable by the processor 330 to control the power source 314 and the high-voltage PSE circuit 306 to apply a powered device classification signal at a selected high-voltage line interface circuit, such as the n-th high-voltage line interface circuit (N) 310, when a valid powered device detection signature is detected during the powered device detection process. The powered device classification instructions 346 may be executed by the processor 330 to control the high voltage PSE circuit 306 to measure a powered device classification signature at the n-th high-voltage line interface circuit (N) 310 using the measurement circuit 320 and to provide the measurement information to the A/D converter 326. The powered device classification instructions 346 may also be used by the processor 330 to determine a powered device power classification associated with the powered device based on a digital version of the powered device classification measurement.

The memory device 334 further includes power management instructions 348, which may be executed by the processor 330 to control the high-voltage PSE circuit 306 to provide a power supply to a powered device via the n-th line interface circuit (N) 310 based on the determined powered device power classification. Further, the memory device 334 includes gain control/level shifting instructions 350, which may be executed by the processor 330 to control gain and level shifting functions at the first and n-th measurement circuits 318 and 320. In a particular example, the gain control/level shifting instructions 350 allow the processor 330 to adjust a gain, to alter a circuit setting to adjust a signal level, or any combination thereof at the measurement circuits 318 and 320. The memory device 334 may also include other instructions 352, which may be executed by the processor 330 as needed. In a particular embodiment, the other instructions 352 may include instructions for handling commands and system instructions received via the system interface 332.

In a particular embodiment, the low-voltage control circuit 302 is programmable to allow for instruction-based adjustment to the control and operation of the high-voltage PSE circuit 306. In particular, the system interface 332 may be used to provide updated instructions to the low-voltage control circuit 302, which may store the instructions at the storage device 334. In a particular embodiment, the storage device 334 may be a flash memory, a hard disk storage device, another type of non-volatile memory, or any combination thereof.

Figure 4:
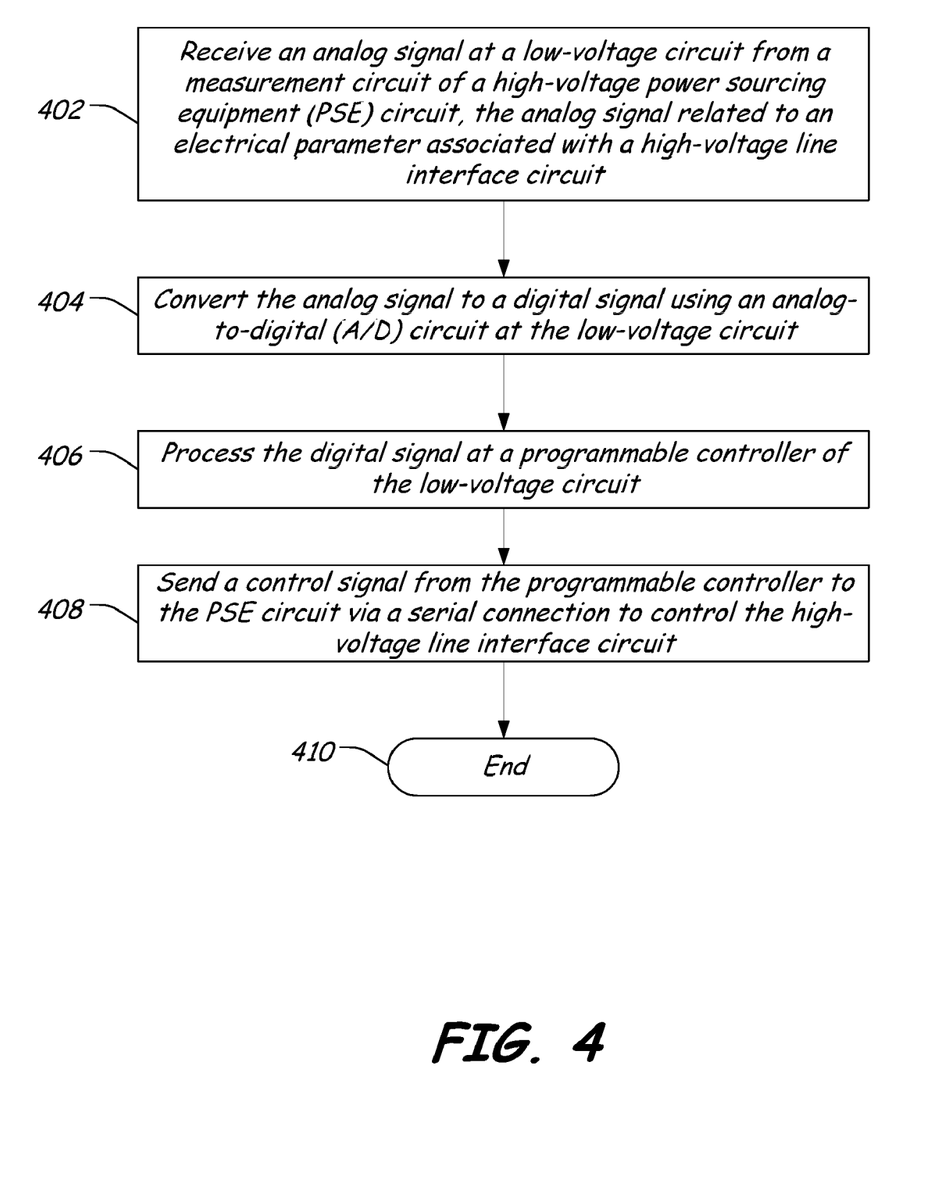
FIG. 4 is a flow diagram of a particular illustrative embodiment of a method of providing power to a powered device via a PSE circuit including a serial interface.

FIG. 4 is a flow diagram of a particular illustrative embodiment of a method of providing power to a powered device via a PSE circuit including a serial interface. At 402, an analog signal is received at a low-voltage circuit from a measurement circuit of a high-voltage power sourcing equipment (PSE) circuit, where the analog signal is related to an electrical parameter associated with a high-voltage line interface circuit. Moving to 404, the analog signal is converted to a digital signal using an analog-to-digital (A/D) circuit at the low-voltage circuit. Continuing to 406, the digital signal is processed at a programmable controller of the low-voltage circuit. In a particular example, processing the digital signal includes determining a power classification associated with a powered device coupled to the high-voltage line interface circuit based on the digital signal.

Proceeding to 408, a control signal is sent from the programmable controller to the PSE circuit via a serial connection to control the high-voltage line interface circuit. In a particular embodiment, sending the control signal includes controlling the high-voltage line interface circuit to provide a power supply to the powered device at a power level specified by the determined power classification. In another particular embodiment, sending the control signal includes sending a first control signal to a common controller of the PSE circuit to provide a first power supply to a first high-voltage line interface circuit of the multiple high-voltage line interface circuits and to provide a second power supply to a second high-voltage line interface circuit of the multiple high-voltage line interface circuits. The method terminates at 410.

In a particular embodiment, the method includes receiving a second analog signal at the A/D circuit of the low-voltage circuit from the measurement circuit. The second analog signal is related to a second electrical parameter that is associated with a second high-voltage line interface circuit. The second analog signal is converted to a second digital signal using the A/D circuit and the second digital signal is processed at the programmable controller. A second control signal is sent to the PSE circuit to control the second high-voltage line interface circuit. In a particular example, the programmable controller is a general-purpose processor adapted to execute instructions stored at a memory of the low-voltage circuit.

Figure 5:
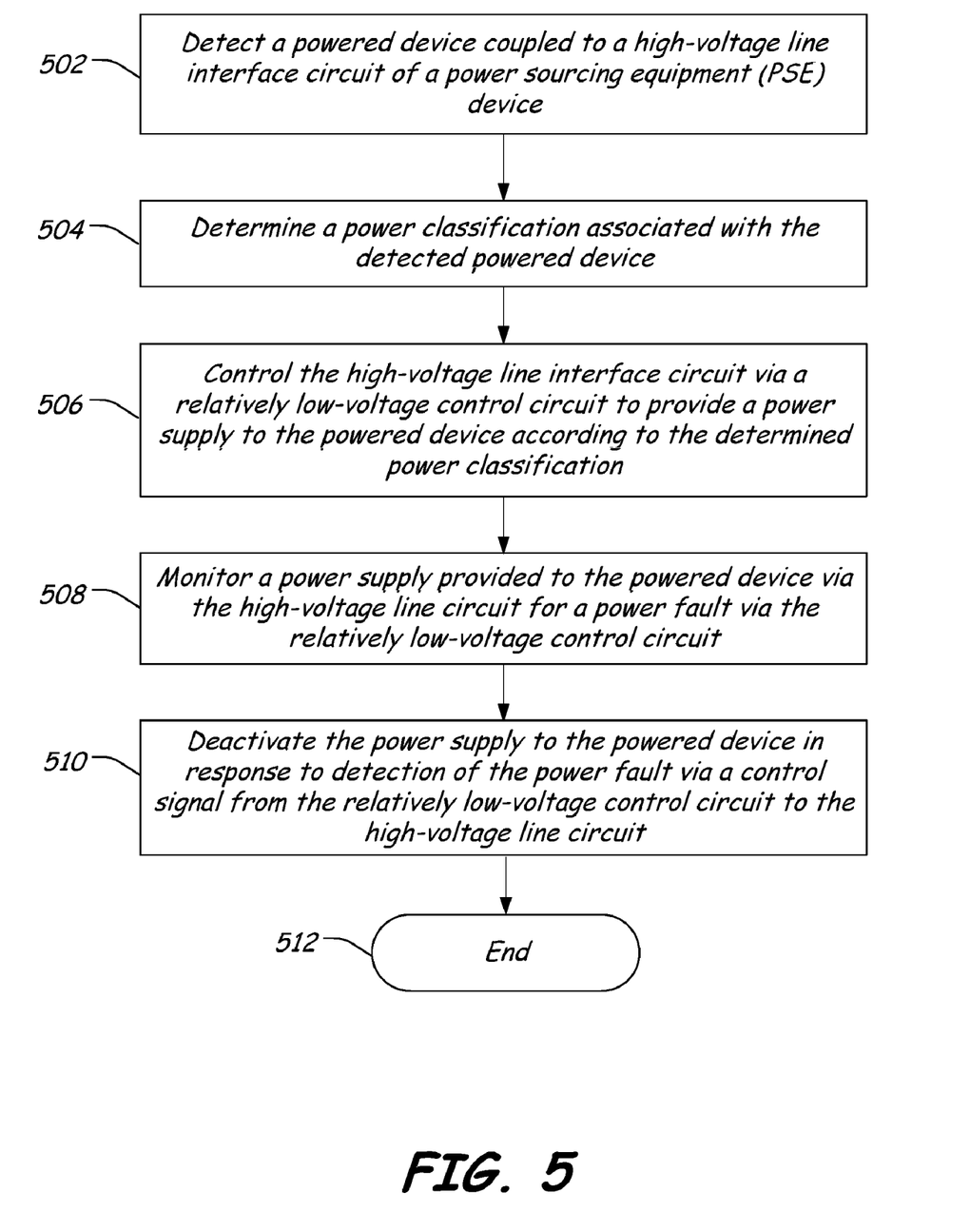
FIG. 5 is a flow diagram of a second particular illustrative embodiment of a method of providing power to a powered device via a PSE circuit including a serial interface.

FIG. 5 is a flow diagram of a second particular illustrative embodiment of a method of providing power to a powered device via a PSE circuit including a serial interface. At 502, a powered device is detected that is coupled to a high-voltage line interface circuit of a power sourcing equipment (PSE) device. Continuing to 504, a power classification is determined that is associated with the detected powered device. Proceeding to 506, the high-voltage line interface circuit is controlled via a relatively low-voltage control circuit to provide a power supply to the powered device according to the predetermined power classification. Advancing to 508, a power supply that is provided to the powered device by the high-voltage line interface circuit is monitored for a power fault via the relatively low-voltage control circuit. Moving to 510, the power supply to the powered device is deactivated in response to detection of the power fault via a control signal from the relatively low-voltage control circuit to the high-voltage line interface circuit. The method terminates at 512.

Figure 6:
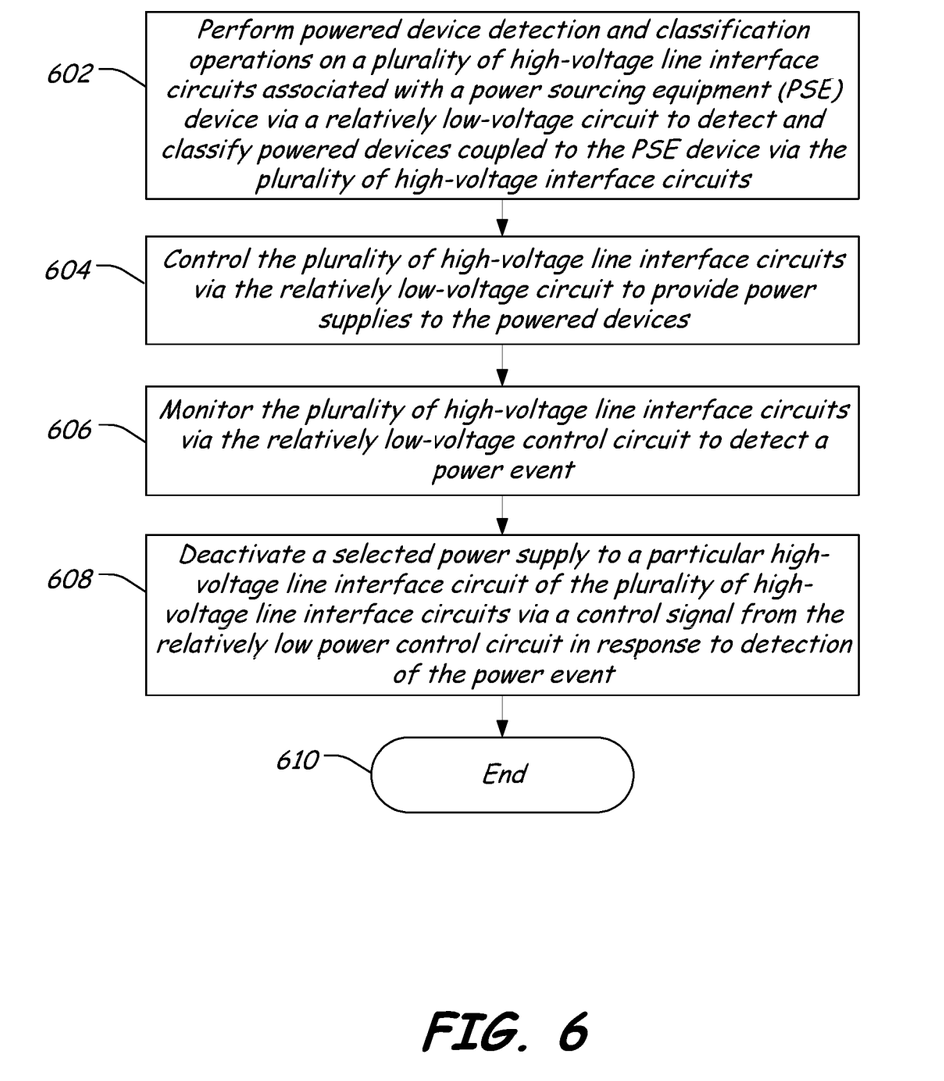
FIG. 6 is a flow diagram of a third particular illustrative embodiment of a method of providing power to a powered device via a PSE circuit including a serial interface.

FIG. 6 is a flow diagram of a third particular illustrative embodiment of a method of providing power to a powered device via a PSE circuit including a serial interface. At 602, powered device detection and classification operations are performed on a plurality of high-voltage line interface circuits associated with a power sourcing equipment (PSE) device via a relatively low-voltage circuit to detect and classify powered devices coupled to the PSE device via the plurality of high-voltage line interface circuits. Moving to 604, the plurality of high-voltage line interface circuits are controlled via the relatively low-voltage control circuit to provide power supplies to the powered devices. Proceeding to 606, the plurality of high-voltage line interface circuits is monitored via the relatively low-voltage control circuit to detect a power event. Advancing to 608, a selected power supply to a particular high-voltage line interface circuit of the plurality of high-voltage line interface circuits is deactivated via a control signal from the relatively low power control circuit in response to detection of the power event. The method terminates at 610.

In general, using a programmable controller at a low-voltage circuit that is coupled to a high voltage PSE circuit via a serial interface, a number of power over Ethernet (PoE) functions can be off-loaded from the high voltage PSE circuit to the low-voltage control circuit. In a particular example, relatively low-voltage rated circuit components can be used to provide control functions, reducing the cost of manufacturing a power sourcing equipment (PSE) device. Further, using a programmable controller to implement as many low-voltage functions as possible, reduces the complexity and the costs associated with circuitry within the high-voltage PSE circuit. Further, by using a programmable controller, such as a general purpose processor, to control the operation of the high-voltage PSE circuit, the programmable controller can be reprogrammed by updating executable instructions stored at a memory device associated with the low-voltage circuit, which can be executed to implement new features, to measure additional electrical parameters, to implement new requirements of a power standard (such as the PoE Standard), or any combination thereof, without having to modify the high-voltage PSE circuit. In a particular example, by removing control circuitry from each of the high-voltage line circuits, the circuit area associated with each of the high voltage line circuits can be reduced.

Although the present invention has been described with reference to preferred embodiments, workers skilled in the art will recognize that changes may be made in form and detail without departing from the spirit and scope of the invention.

What is claimed is:

1. A circuit device comprising:
   a power sourcing equipment (PSE) circuit including a plurality of high-voltage line circuits adapted to communicate with a respective plurality of powered devices via network cables, the PSE circuit including a serial interface circuit and a common controller coupled to the serial interface circuit and to the plurality of high-voltage line circuits; and
   a low-voltage circuit including a programmable controller adapted to transmit control signals to the common controller via the serial interface circuit to control operation of the plurality of high-voltage line circuits.

2. The circuit device of claim 1, wherein the PSE circuit further comprises a measurement circuit to measure electrical parameters associated with the plurality of high-voltage line circuits.

3. The circuit device of claim 2, further comprising a multiplexer to selectively couple the measurement circuit to a selected high-voltage line circuit of the plurality of high-voltage line circuits.

4. The circuit device of claim 2, wherein the low-voltage circuit comprises an analog-to-digital (A/D) circuit to convert measurements related to the electrical parameters to a digital signal.

5. The circuit device of claim 1, further comprising a memory to store instructions defining control functions executable by the programmable controller to control the plurality of high-voltage line circuits.

6. The circuit device of claim 1, wherein the PSE circuit and the low-voltage circuit are formed on a single die.

7. The circuit device of claim 1, wherein the PSE circuit and the low-voltage control circuit are disposed on separate dies within a single circuit package.

8. The circuit device of claim 1, wherein the PSE circuit and the low-voltage control circuit are in different packages, and wherein the low-voltage control circuit is coupled to the serial interface circuit via a serial connection.

9. A method of controlling a power supply to a powered device, the method comprising:
receiving an analog signal at a low-voltage circuit from a measurement circuit of a high-voltage power sourcing equipment (PSE) circuit, the analog signal related to an electrical parameter associated with a high-voltage line interface circuit;
converting the analog signal to a digital signal using an analog-to-digital (A/D) circuit at the low-voltage circuit;
processing the digital signal at a programmable controller of the low-voltage circuit; and
sending a control signal from the programmable controller to the PSE circuit via a serial connection to control the high-voltage line interface circuit.

10. The method of claim 9, wherein processing the digital signal comprises determining a power classification associated with a powered device coupled to the high-voltage line interface circuit based on the digital signal.

11. The method of claim 10, wherein sending the control signal comprises controlling the high-voltage line interface circuit to provide a power supply to the powered device at a power level specified by the determined power classification.

12. The method of claim 9, further comprising:
receiving a second analog signal at the A/D circuit of the low-voltage circuit from the measurement circuit, the second analog signal related to a second electrical parameter associated with a second high-voltage line interface circuit; and
converting the second analog signal to a second digital signal using the A/D circuit;
processing the second digital signal at the programmable controller; and
sending a second control signal to the PSE circuit to control the second high-voltage line interface circuit.

13. The method of claim 9, wherein the programmable controller comprises a general-purpose processor adapted to execute instructions stored at a memory of the low-voltage circuit.

14. The method of claim 9, wherein sending the control signal comprises sending a first control signal to a common controller of the PSE circuit to provide a first power supply to a first high-voltage line interface circuit of the multiple high-voltage line interface circuits and to provide a second power supply to a second high-voltage line interface circuit of the multiple high-voltage line interface circuits.

15. A power sourcing equipment (PSE) device comprising:
a power sourcing equipment (PSE) circuit comprising:
multiple high-voltage line interface circuits to provide power to one or more powered devices;
a common controller adapted to control operation of the multiple high-voltage line interface circuits; and
a serial interface; and
a low-voltage circuit coupled to the PSE circuit via the serial interface, the low-voltage circuit including a programmable controller to send commands to the common controller to control respective power levels supplied to the multiple high-voltage line interface circuits.

16. The PSE device of claim 15, wherein the PSE circuit further includes a measurement circuit including a gain/level shifter circuit and an analog multiplexer to measure an electrical parameter associated with a selected high-voltage line interface circuit of the multiple high-voltage line interface circuits, the measurement circuit to produce an analog output related to the electrical parameter.

17. The PSE device of claim 16, wherein the low-voltage circuit further includes an analog-to-digital (A/D) circuit to convert the analog output to a digital signal, the programmable controller adapted to process the digital signal to determine a power requirement of a powered device coupled to a particular high-voltage line interface circuit of the multiple high-voltage line interface circuits, the programmable controller to control the particular high-voltage line interface circuit to supply power to the powered device according to the determined power requirement.

18. The PSE device of claim 17, wherein the programmable controller is adapted to process the digital signal to determine a parameter associated with the selected high-voltage line interface circuit, wherein the parameter comprises one of a temperature, an average current, an average voltage, a peak current, and a peak voltage.

19. The PSE device of claim 15, wherein the low-voltage circuit further includes a memory to store instructions executable by the programmable controller.

20. The PSE device of claim 19, wherein the programmable controller is adapted to execute the stored instructions to control the common controller, wherein the stored instructions define a plurality of PSE functions including a powered device detection function and a powered device classification function.

* * * * *